US011423699B2

(12) United States Patent
Yin et al.

(10) Patent No.: US 11,423,699 B2
(45) Date of Patent: Aug. 23, 2022

(54) ACTION RECOGNITION METHOD AND APPARATUS AND ELECTRONIC EQUIPMENT

(71) Applicant: FUJITSU LIMITED, Kawasaki (JP)

(72) Inventors: Rui Yin, Beijing (CN); Xiantan Zhu, Beijing (CN); Zhiming Tan, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 39 days.

(21) Appl. No.: 17/035,775

(22) Filed: Sep. 29, 2020

(65) Prior Publication Data

US 2021/0110146 A1 Apr. 15, 2021

(30) Foreign Application Priority Data

Oct. 15, 2019 (CN) .......................... 201910977125.2

(51) Int. Cl.
 *G06V 40/20* (2022.01)
 *G06T 7/215* (2017.01)
 *G06V 10/46* (2022.01)
 *G06V 40/18* (2022.01)

(52) U.S. Cl.
 CPC .............. *G06V 40/23* (2022.01); *G06T 7/215* (2017.01); *G06V 10/462* (2022.01); *G06V 40/18* (2022.01)

(58) Field of Classification Search
 CPC .......... G06K 9/00342; G06K 9/00369; G06K 9/00335; G06K 9/00375; G06K 9/46; G06K 9/00597; G06K 9/4671; G06T 7/215; G06T 11/00
 See application file for complete search history.

(56) References Cited

U.S. PATENT DOCUMENTS

| 2009/0252423 | A1* | 10/2009 | Zhu ..................... G06K 9/00201 |
| | | | 382/209 |
| 2010/0215271 | A1* | 8/2010 | Dariush ............... G06K 9/4671 |
| | | | 382/180 |
| 2010/0303289 | A1 | 12/2010 | Polzin et al. |
| 2013/0230211 | A1* | 9/2013 | Tanabiki ................... G06T 7/75 |
| | | | 382/103 |

(Continued)

FOREIGN PATENT DOCUMENTS

| CN | 106022213 A | 10/2016 |
| CN | 105138995 B | 6/2019 |

OTHER PUBLICATIONS

Continuous Human Action Recognition Using Depth-MHI-HOG and a Spotter Model (Year: 2015).*

(Continued)

*Primary Examiner* — Nizar N Sivji
(74) *Attorney, Agent, or Firm* — Xsensus LLP

(57) ABSTRACT

Embodiments of this disclosure provide an action recognition method and apparatus and an electronic equipment. The action recognition apparatus includes: a key-point feature extracting unit configured to process information on key points in a target human body in an image frame, to calculate key-point features of the target human body, the key-point features including a position of a predetermined key point and an angle of a predetermined joint in the target human body; and a first recognizing unit configured to recognize an action of the target human body according to the key-point features, and output a first recognition result.

8 Claims, 6 Drawing Sheets

(56) References Cited

U.S. PATENT DOCUMENTS

| | | | | |
|---|---|---|---|---|
| 2014/0145936 | A1* | 5/2014 | Gu | G06F 3/0304 345/156 |
| 2015/0062301 | A1* | 3/2015 | Lin | G06K 9/52 348/46 |
| 2015/0294481 | A1* | 10/2015 | Sakaue | A61B 5/112 382/103 |
| 2017/0228587 | A1* | 8/2017 | Zhang | G06K 9/469 |
| 2019/0147292 | A1* | 5/2019 | Watanabe | G06F 16/5838 382/103 |
| 2019/0251341 | A1* | 8/2019 | Nie | G06K 9/00348 |
| 2020/0034659 | A1* | 1/2020 | Sato | G06T 7/00 |
| 2020/0089958 | A1* | 3/2020 | Zhu | G06K 9/00369 |
| 2020/0211154 | A1* | 7/2020 | Ng | G06K 9/00718 |
| 2021/0081689 | A1* | 3/2021 | Weyers | G06K 9/6273 |
| 2021/0097717 | A1* | 4/2021 | Wang | G06K 9/00208 |

OTHER PUBLICATIONS

Human Gesture Analysis for Action Recognition (Year: 2016).*
Human Action Recognition of Hidden Markov Model Based on Depth Information (Year: 2016).*
Recognition of Free Gymnastics Using Human Body Feature Points From Silhouette and Skin Region (Year: 2002).*
Human-like Action Recognition System Using Features Extracted by Human (Year: 2002).*
Nie Qiang et al.: "View-Invariant Human Action Recognition Based on a 3D Bio-Constrained Skeleton Model", IEEE Transactions on Image Processing, vol. 28, No. 8, Aug. 1, 2019, 14 pp.
Extended European Search Report dated Mar. 16, 2021, for counterpart European patent application No. 20198943.1.

* cited by examiner

ACTION RECOGNITION METHOD AND APPARATUS AND ELECTRONIC EQUIPMENT

CROSS-REFERENCE TO RELATED APPLICATIONS

This patent application is based on and claims priority pursuant to 35 U.S.C. § 119(a) to Chinese Patent Application No. 201910977125.2, filed on Oct. 15, 2019, in the Chinese Patent Office, the entire disclosure of which is hereby incorporated by reference herein.

TECHNICAL FIELD

This disclosure relates to the field of electronic information technologies.

BACKGROUND

Human action recognition has a wide range of application prospects. For example, human action recognition may be applied to consumer behavior analysis, health care, smart factories and other scenarios.

In existing techniques, common action recognition methods include: performing human action recognition based on image frames captured by a camera, such as classifying image frames by using a classifier based on a deep learning network, so as to recognize human body actions in an image frame; or, extracting key points of the human body from the image frames captured by the camera, and recognizing human body actions according to the key points.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that common action recognition methods have some limitations. For example, in a method using a deep learning network based classifier, a large number of training data are needed to train the deep learning network, and the method is address to directly classify image signals, so an amount of calculation is large, it will be interfered by other information in the image, and a recognition efficiency is not high. Moreover, if a new action is to be recognized, the deep learning network needs to be re-trained for the new action. Therefore, the method is poor in scalability, and in a method for recognizing actions based on key points of a human body, because the parameters used are relatively unitary, accuracy of the recognition result is difficult to guarantee.

Embodiments of this disclosure provide an action recognition method and apparatus and an electronic equipment. The action recognition apparatus recognizes an action of a human body according to a position of a predetermined key point and an angle of a predetermined joint in the target human body in an image frame, which is less in calculation amount, and relatively high in accuracy.

According to a first aspect of the embodiments of this disclosure, there is provided an action recognition apparatus, including: a key-point feature extracting unit configured to process information on key points in a target human body in an image frame, to calculate key-point features of the target human body, the key-point features including a position of a predetermined key point and an angle of a predetermined joint in the target human body; and a first recognizing unit configured to recognize an action of the target human body according to the key-point features, and output a first recognition result.

According to a second aspect of the embodiments of this disclosure, there is provided an action recognition method, including: processing information on key points in a target human body in an image frame, to calculate key-point features of the target human body, the key-point features including a position of predetermined key point and an angle of a predetermined joint in the target human body; and recognizing an action of the target human body according to the key-point features, and outputting a first recognition result.

According to a third aspect of the embodiments of this disclosure, there is provided an electronic equipment, including the action recognition apparatus as described in the first aspect.

An advantage of the embodiments of this disclosure exists in that an action of a human body is recognized according to a position of a predetermined key point and an angle of a predetermined joint in the target human body in an image frame, which is less in calculation amount, and relatively high in accuracy.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "include/comprise" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION OF THE DISCLOSURE

These and further aspects and features of this disclosure will be apparent with reference to the following description and attached drawings. In the description and drawings, particular embodiments of this disclosure have been disclosed in detail as being indicative of some of the ways in which the principles of this disclosure may be employed, but it is understood that this disclosure is not limited correspondingly in scope. Rather, this disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

First Aspect of the Embodiments

The first aspect of the embodiments provides an action recognition apparatus.

Figure 1:
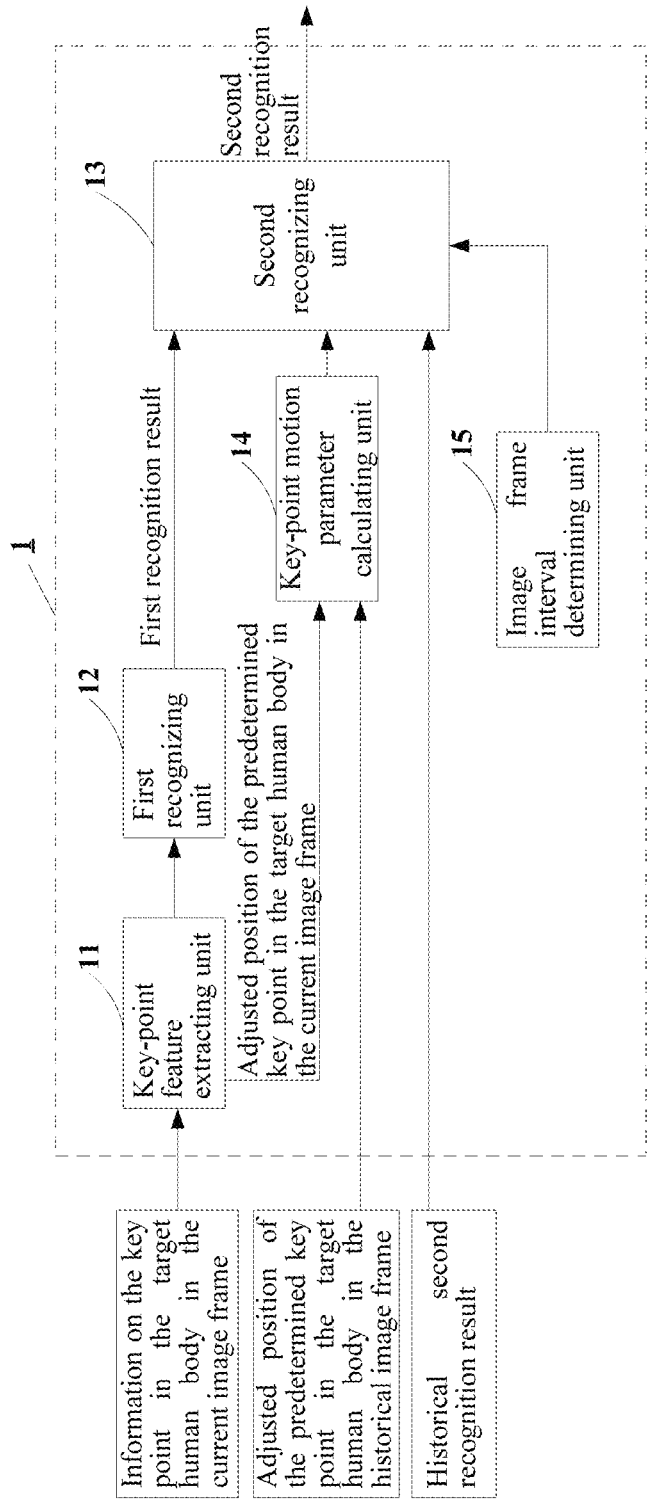
FIG. 1 is a schematic diagram of the action recognition apparatus of the first aspect of the embodiments of this disclosure.

FIG. 1 is a schematic diagram of the action recognition apparatus of the first aspect of the embodiments of this disclosure. As shown in FIG. 1, the action recognition apparatus 1 includes: a key-point feature extracting unit 11 and a first recognizing unit 12.

The key-point feature extracting unit 11 is configured to process information on key points in a target human body in an image frame, to calculate key-point features of the target human body, the key-point features including a position of a predetermined key point and an angle of a predetermined joint in the target human body; and the first recognizing unit 12 is configured to recognize an action of the target human body according to the key-point features calculated by the key-point feature extracting unit 11, and output a first recognition result.

According to the first aspect of the embodiments of this disclosure, the action recognition apparatus 1 recognizes an action of the human body according to the position of the key point and the angle of the joint in the human body in the image frame. The position of the key point and the angle of the joint are a part of the information in the image frame, hence, the first recognizing unit 12 may accurately classify with a relatively small amount of calculation without needing to use a deep learning network. And in comparison with a scheme where action recognition is performed based only on a position of a key point, the action recognition apparatus 1 of this disclosure performs action recognition according also to the angle of the joint of the human body, hence, an accuracy of recognition will be higher. And furthermore, if an action needing to be recognized needs to be added or changed, it may be realized by adjusting the predetermined key point and/or the predetermined joint, without needing a large amount of training. Hence, the action recognition apparatus 1 of this disclosure is relatively better in scalability and relatively higher in flexibility.

In at least one embodiment, the image frame may be, for example, an image frame in a video captured by a camera. Image frames may be in an order in a time sequence. For example, an n-th image frame corresponds to a moment Tn in the time sequence; where, n is a natural number.

In the following description of this disclosure, in a case of recognizing an action of the target human body in the n-th image frame, the n-th image frame is referred to as a current image frame, and an image preceding the current image frame in the time sequence is referred to as a historical image frame; for example, the historical image frame corresponds to a moment T(n-k) in the time sequence.

In at least one embodiment, the information on the key point in the target human body in the current image frame may be input to the key-point feature extracting unit 11.

The information on the key point in the target human body in the current image frame may be, for example, coordinate values of the key points on the target human body in the current image frame, which may be denoted by the number of pixels in two mutually perpendicular directions; where, coordinate values of an upper leftmost pixel in the current image frame may be set to be (0, 0), and the two mutually perpendicular directions may be a width direction and a height direction of the current image frame.

Figure 2:
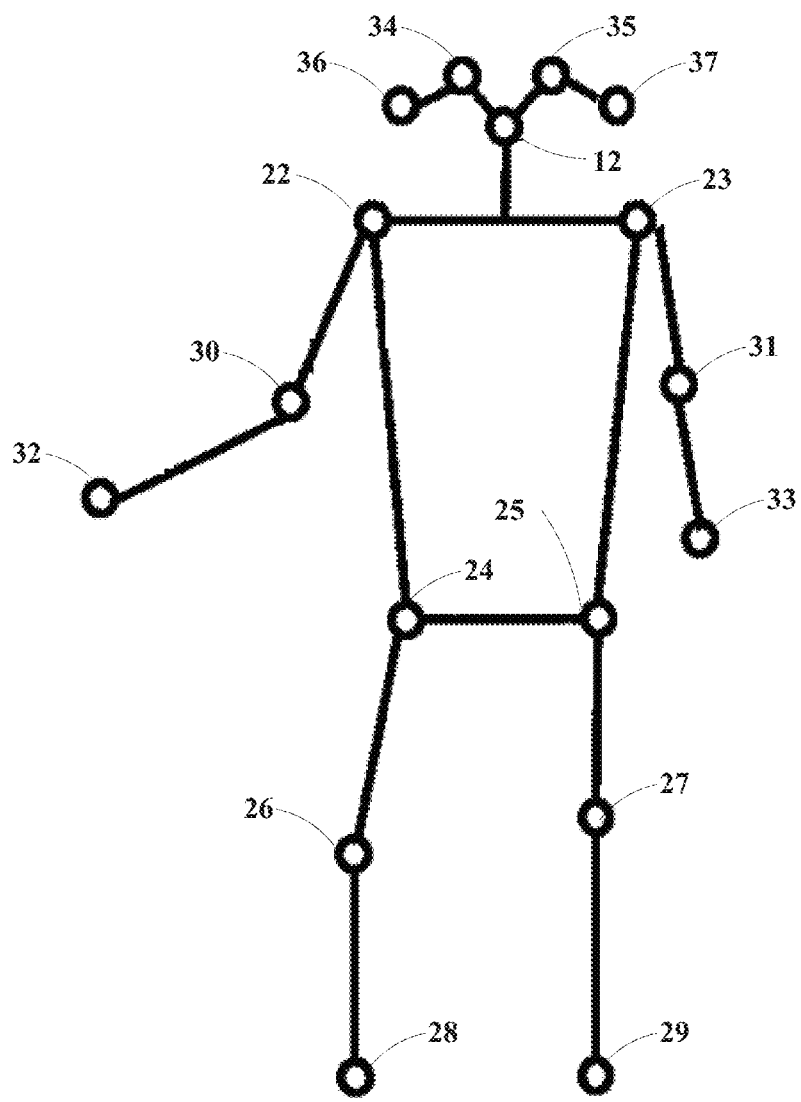
FIG. 2 is a schematic diagram of a key point in a target human body in a current image frame.

FIG. 2 is a schematic diagram of the key points in the target human body in the current image frame. As shown in FIG. 2, the key points may be, for example, the nose 21, the left shoulder 22, the right shoulder 23, the left hip 24, the right hip 25, the left knee 26, the right knee 27, the left ankle 28, the right ankle 29, the left elbow 30, the right elbow 31, the left wrist 32, the right wrist 33, the left eye 34, the right eye 35, the left ear 36, and the right ear 37, of the target human body. Distribution of the key points shown in FIG. 2 is an example only, and this disclosure is not limited thereto.

In at least one embodiment, the information on the key points in FIG. 2 may be obtained by performing target detection on the current image frame. For example, the target human body in the current image frame and body parts of the target human body are detected by using a template method, etc., a key point is set in each detected part to represent the part, and coordinate values of key points are outputted as the information on the key points in the target human body in the current image frame. For another example, a sensor may be set on a human body taken as a subject of a camera, and the information on the key points in the target human body in the current image frame is determined according to information sensed by the sensor.

In at least one embodiment, the key-point feature extracting unit 11 may select at least a part of the key points in the information on the target human body in the current image frame inputted therein as the predetermined key points, and process information on the predetermined key points.

Figure 3:
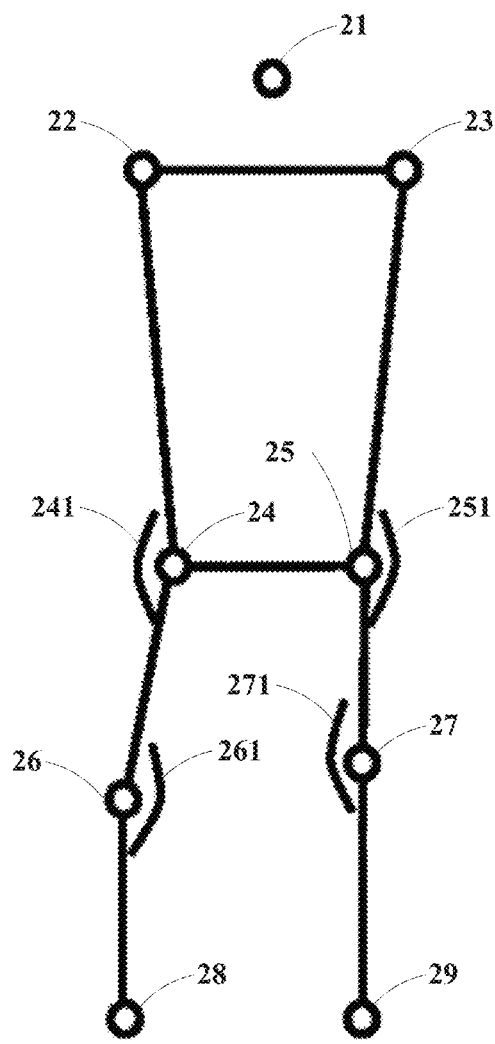
FIG. 3 is a schematic diagram of predetermined key points.

FIG. 3 is a schematic diagram of the predetermined key points. As shown in FIG. 3, the predetermined key points may be, for example, the nose 21, the left shoulder 22, the right shoulder 23, the left hip 24, the right hip 25, the left knee 26, the right knee 27, the left ankle 28, and the right ankle 29, of the target human body. In addition, as shown in FIG. 3, a joint 241 at the left hip 24, a joint 251 at the right hip 25, a joint 261 at the left knee 26, and a joint 271 at the right knee 27, may be predetermined joints.

What are shown in FIG. 3 are only examples of the predetermined key points and the predetermined joints. However, this disclosure is not limited thereto, and the predetermined key points and predetermined joints may be set according to actions needing to be recognized. For example, in a case where actions related to a torso and a leg of the human body need to be recognized, nine predetermined key points and four predetermined joints may be set as shown in FIG. 2, and the nine key points may not be located in such parts as arms; and for example, in a case where other actions of the human body need to be recognized, such as when lifting or opening of arms needs to be recognized, the key points in the arm (such as the left elbow 30, the right elbow 31, the left wrist 32, and the right wrist 33, in FIG. 2) may be set as predetermined key points, and joints at the left elbow 30 and the right elbow 31 may be set as predetermined joints.

In at least one embodiment, the key-point features of the target human body in the current image frame extracted by the key-point feature extracting unit 11 include the position of the predetermined key point and the angle of the predetermined joint in the target human body in the current image frame.

Figure 4:
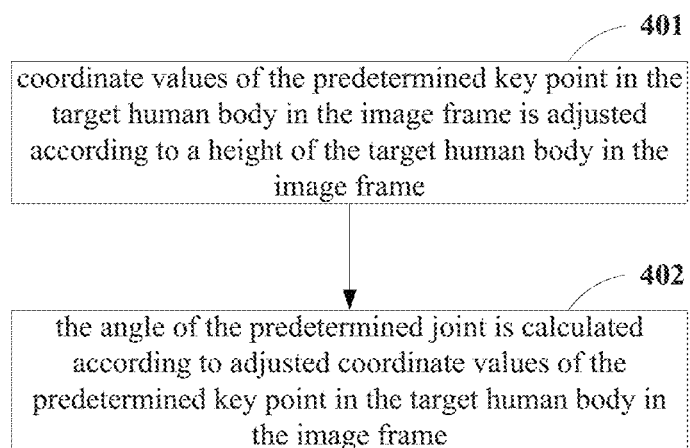
FIG. 4 is a schematic diagram of a method for calculating a key-point feature by the key-point feature extracting unit.

FIG. 4 is a schematic diagram of a method for calculating a key-point feature by the key-point feature extracting unit 11. As shown in FIG. 4, the method includes:

operation 401: coordinate values of the predetermined key point in the target human body in the image frame are adjusted according to a height of the target human body in the image frame; and operation 402: the angle of the predetermined joint is calculated according to adjusted coordinate values of the predetermined key point in the target human body in the image frame.

In operation 401, the height of the target human body in the current image frame may be H shown in FIG. 2, that is, a difference between a coordinate value in a height direction of a key point where an eye of the target human body (such as the left eye 34 or the right eye 35 in FIG. 2) in the image frame is located and a coordinate value in a height direction of a key point where an ankle of the target human body (such as the left ankle 28 or the right ankle 29 in FIG. 2) in the image frame is located.

In operation 401, a ratio of the height H of the target human body in the current image frame to a preset standard height H0 may be calculated, and the adjusted coordinate values may be obtained by dividing coordinate values of predetermined pixels of the target human body in the current image frame (coordinate values in the height direction and coordinate values in the width direction) by the ratio.

With operation 401, the coordinate values of the predetermined key points of the target human body in the current image frame may be normalized, so as to avoid changes of the coordinate values of the predetermined key points due to a distance between the subject and the camera or a difference between field angles, thereby improving accuracy of recognition.

And this disclosure may not be limited thereto. In operation 401, other methods may also be used to adjust the coordinate values of the predetermined key points. Furthermore, the coordinate values of the predetermined key points may also be adjusted according to other dimensions of the target human body.

In operation 402, angles of a joint 241, a joint 251, a joint 261, and a joint 271 may be calculated according to the adjusted coordinate values. The angle of the joint 241 is, for example, an included angle between a connecting line L1 of the left shoulder 22 and the left hip 24 and a connecting line L2 of the left hip 24 and the left knee 26, in FIG. 3, and angles of other joints are calculated similarly.

In at least one embodiment, the key-point features of the target human body in the current image frame extracted by the key-point feature extracting unit 11 are inputted into the first recognizing unit 12, and the first recognizing unit 12 recognizes the action of the target human body according to the information on the key-point features, and outputs the first recognition result. The first recognizing unit 12 may perform the recognition based on a shallow learning network. Hence, accurate recognition may be performed with a relatively small amount of calculation.

For example, the first recognizing unit 12 may perform the recognition based on a multilayer perception machine model, which may include an input layer, two hidden layers and an output layer; the input layer may be inputted with a 1*22 vector, which contains, for example, the coordinate values in the height direction and the width direction of the nine predetermined key points and the angles of the four predetermined joints shown in FIG. 3; the hidden layers may, for example, include 100 nodes, respectively; and the output layer may output probabilities of six types of actions, such as walking, standing, sitting, squatting, lying, and bending. An action with a highest probability is the first recognition result of the first recognizing unit 12.

In this application, the multilayer perception machine model is an example only, and the first recognizing unit 12 may also perform recognition based on other models, such as a support vector machine (SVM) model.

In at least one embodiment, as shown in FIG. 1, the action recognition apparatus 1 may further include: a second recognizing unit 13.

According to a parameter of motion of the predetermined key point in the target human body, and/or a second recognition result outputted by the second recognizing unit 13 for an action of the target human body in a historical image frame preceding the image frame (i.e. a historical second recognition result), the second recognizing unit 13 corrects the first recognition result of the first recognizing unit 12 for the action of the target human body in the current image frame, and outputs the second recognition result for the action of the target human body in the image frame.

In at least one embodiment, the motion parameter of the predetermined key point on the target human body may be obtained according to the adjusted position of the predetermined key point in the target human body in the current image frame and the adjusted predetermined key point in the target human body in the historical image frame. For example, as shown in FIG. 1, the action recognition apparatus 1 may further include a key-point motion parameter calculating unit 14 configured to calculate motion vectors between each predetermined key point in the target human body in the image frame and a predetermined key point in the target human body in the historical image frame, and calculate the parameters of motion of the predetermined key points in the target human body according to the motion vectors of the predetermined key points.

The key-point feature extracting unit 11 may perform the processing as described in operation 401 of FIG. 4 on information that is the key points in the target human body in the historical image frame, to obtain the adjusted positions of the predetermined key points on the target human body in the historical image frame.

In at least one embodiment, the parameters of motion of the predetermined key points in the target human body include: a mean value of a difference between the coordinate values (i.e., the motion vectors) of the predetermined key points, and/or a standard variance of a difference between the coordinate values (i.e., the motion vectors) of the predetermined key points, and/or moving directions of the predetermined key points, and/or the number of the predetermined key points moving in a predetermined direction. However, this embodiment may not be limited thereto, and the motion parameters of the predetermined key points in the target human body may also be other parameters.

It should be noted that in the second recognizing unit 13 and the key-point motion parameter calculating unit 14, the target human body in the current image frame and the target human body in the historical image frame correspond to the same photographed person, and the target human body corresponding to the same photographed person in the current image frame and the historical image frame may be determined based on a target tracking technique.

In addition, the second recognition result outputted by the second recognizing unit 13 for the current image frame may be inputted into the second recognizing unit 13 for performing action recognition of the target human body in a subsequent image frame after the current image frame.

Figure 5:
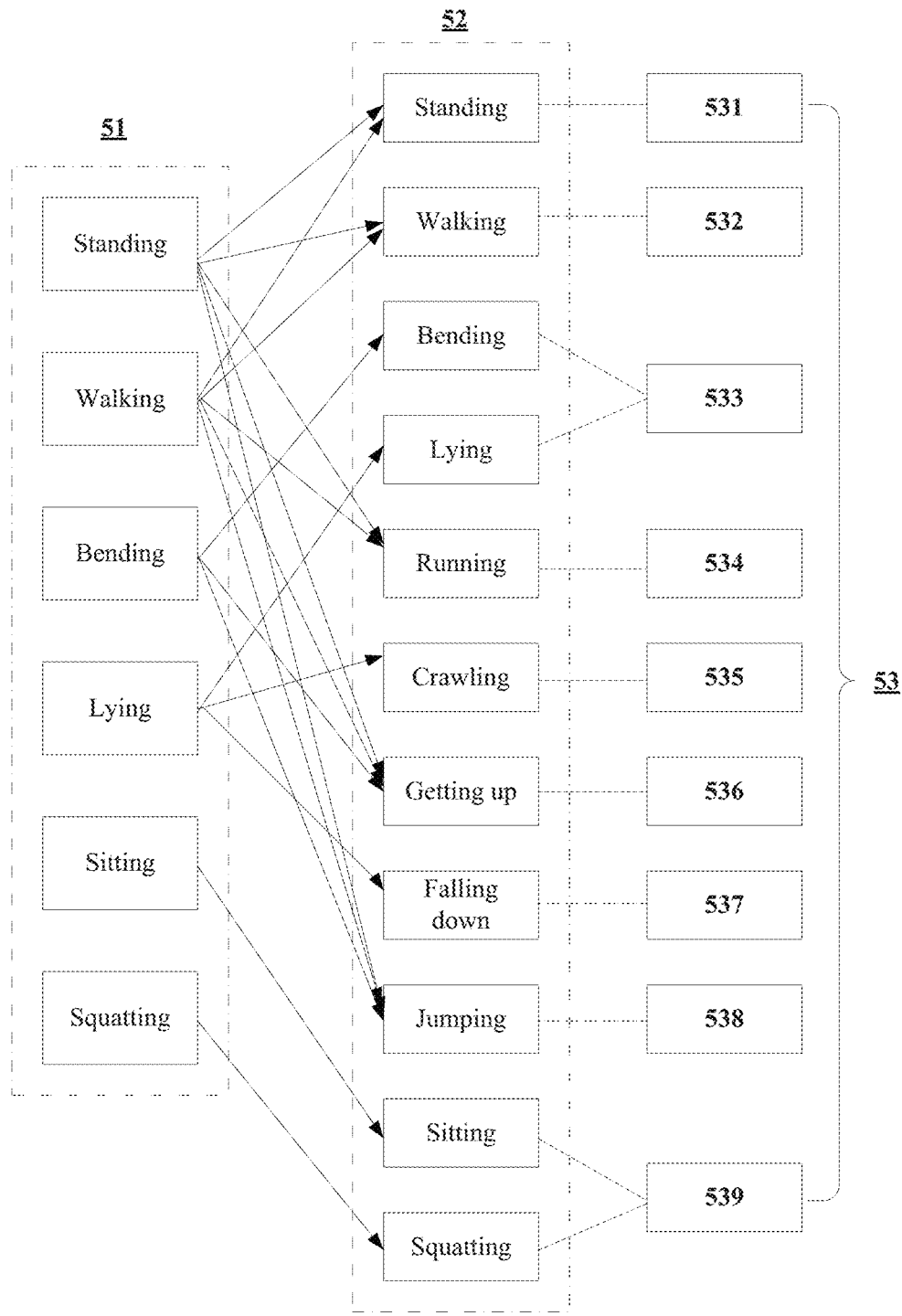
FIG. 5 is a schematic diagram of adjusting a first recognition result by the second recognizing unit.

FIG. 5 is a schematic diagram of adjusting the first recognition result by the second recognizing unit 13. As shown in FIG. 5, 51 denotes the first recognition result, 52 denotes the second recognition result, and 53 denotes bases for generating the second recognition result 53 by the second recognizing unit 13.

As shown in FIG. 5, the second recognition result may be, for example, walking, standing, sitting, squatting, lying, bending, running, crawling, getting up, falling down, and jumping, etc.

As shown in FIG. 5, the bases 531~539 may be:

basis 531: if the first recognition result is "walking" and the mean value of the motion vectors of the predetermined key points is less than a first threshold (thread_walk), the second recognition result is "standing";

basis 532: if the first recognition result is "walking" and the mean value of the motion vectors of the predetermined key points is greater than or equal to the first threshold (thread_walk), the second recognition result is "walking";

basis 533: if the first recognition result is "bending" or "lying", the second recognition result is identical to the first recognition result;

basis 534: if the first recognition result is "standing" or "walking" and the mean value of the motion vectors of the predetermined key points is greater than or equal to a second threshold (thread_run), the second recognition result is "running";

basis 535: if the first recognition result is "lying" and the mean value of the motion vectors of the predetermined key points is greater than or equal to a third threshold (thread_crawl), the second recognition result is "crawling";

basis 536: if the first recognition result is "standing" or "walking" or "bending", the second recognition result of the historical image frame is "sitting" or "crawling" or "lying" and the number of predetermined key points moving upward is greater than 9, the second recognition result is "standing";

basis 537: if the first recognition result is "lying", the second recognition result of the historical image frame is "standing" or "walking" or "bending" and the number of predetermined key points moving upward is less than or equal to 3, the second recognition result is "falling down";

basis 538: if the first recognition result is "standing" or "walking" or "bending", the number of predetermined key points moving upward is equal to 13 or equal to 0 and the mean value of the motion vectors of the predetermined key points is greater than or equal to a fourth threshold (thread jump), the second recognition result is "jumping"; and basis 539: if the first recognition result is "sitting" or "squatting", the second recognition result is identical to the first recognition result.

The first recognition result 51, the second recognition result 52 and the bases 531~539 shown in FIG. 5 are examples only, and the embodiments of this disclosure are not limited thereto.

With the second recognizing unit 13, the recognition result of action may be adjusted based on a relationship between actions of the human body and time, hence, the action of the human body may be recognized more accurately.

In at least one embodiment, as shown in FIG. 1, the action recognition apparatus 1 may further include an image frame interval determining unit 15 configured to determine an amount of image frames spacing the historical frame and the image frame apart according to an image frame acquisition rate (such as a frame rate of image frames taken by the camera, i.e. frames per second (FPS)).

Table 1 shows a correspondence between a frame rate of an image frame and the historical image frames.

| Frames per second (FPS) | 3~8 | 9~14 | 15~20 | 21~26 | 27~32 |
|---|---|---|---|---|---|
| Historical image frames | n-1 | n-2 | n-3 | n-4 | n-5 |

In Table 1, when the current image frame is an n-th frame, if the frame rate is 3~8, the historical image frame is an (n−1)-th frame; if the frame rate is 9~14, the historical image frame is an (n−2)-th frame; if the frame rate is 15~20, the historical image frame is an (n−3)-th frame; if the frame rate is 21~26, the historical image frame is an (n−4)-th frame; and if the frame rate is 27~32, the historical image frame is an (n−5)-th frame.

Hence, in a case where the frame rate of the image frame changes, the amount of image frames spacing the historical frame and the image frame apart may be selected by the image frame interval determining unit 15, so that the action recognition apparatus 1 is used while the above set thresholds (such as the first to the fourth thresholds concerned in FIG. 5) are kept unchanged, thereby expanding an application scope of the action recognition apparatus 1 and improving its scalability.

According to the first aspect of the embodiments of this disclosure, the action recognition apparatus 1 recognizes the action of the human body based on the positions of the key points and the angles of joints in the human body in the image frame. As the positions of the key points and the angles of the joints are a part of the information in the image frame, the first recognizing unit 12 may perform accurate classification with a relatively small amount of calculation without needing to use a deep learning network; and in comparison with a scheme of performing action recognition based only on the positions of key points, the action recognition apparatus 1 of this disclosure may further perform action recognition based the angles of the joints in the human body, hence, an accuracy of recognition will be higher. And furthermore, if an action needing to be recognized needs to be added or changed, it may be realized by adjusting the predetermined key point and/or the predetermined joint, without needing a large amount of training. Hence, the action recognition apparatus 1 of this disclosure is relatively good in scalability and relatively high in flexibility. And furthermore, as the action recognition apparatus 1 of this disclosure is able to adjust the action recognition results based on the relationship between actions of the human body and time, the action of the human body may be recognized more accurately.

Second Aspect of the Embodiments

The second aspect of the embodiments of this disclosure provides an action recognition method, corresponding to the action recognition apparatus described in the first aspect of the embodiments of this disclosure.

Figure 6:
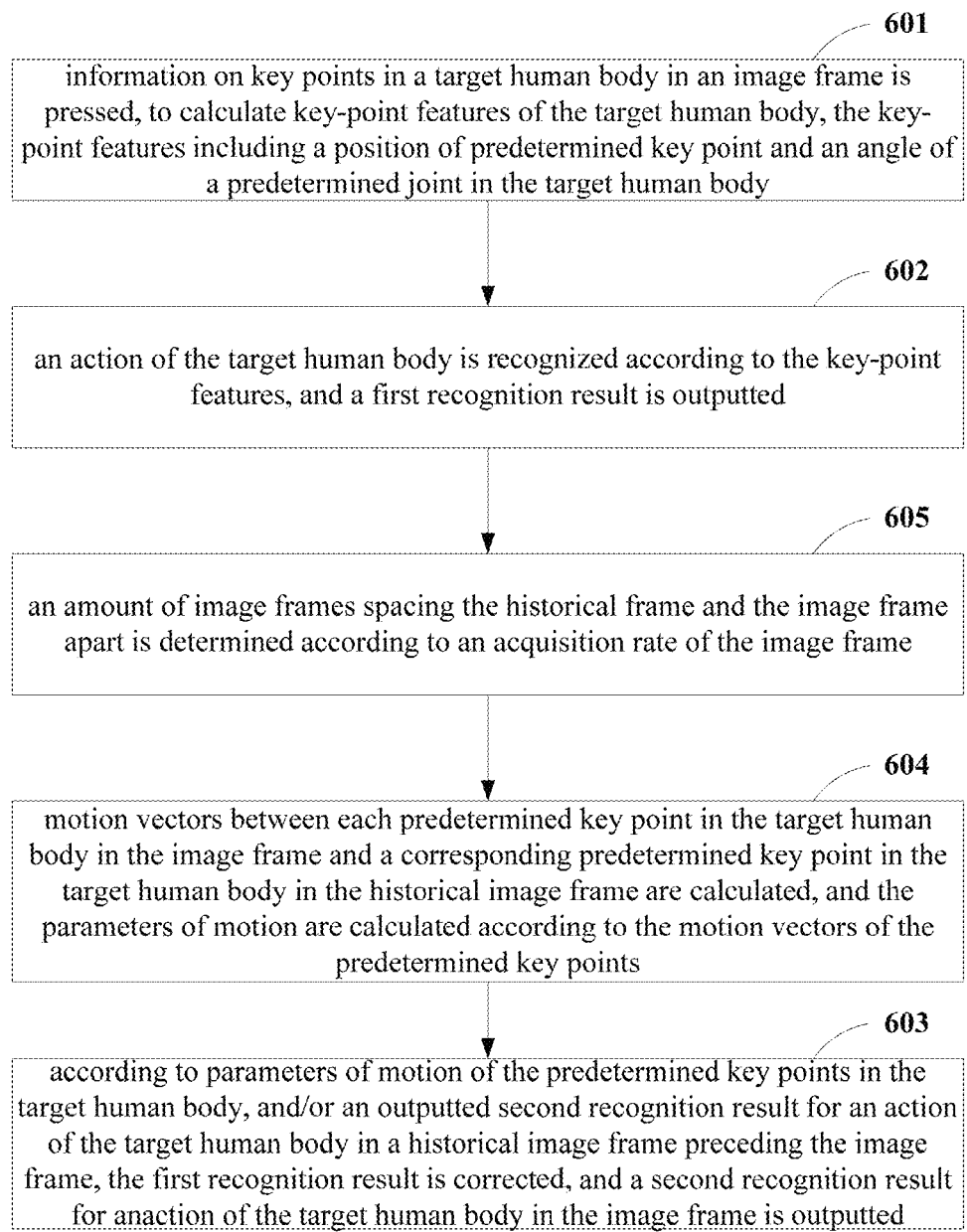
FIG. 6 is a schematic diagram of the action recognition method of the second aspect of the embodiments of this disclosure.

FIG. 6 is a schematic diagram of the action recognition method of the second aspect of the embodiments of this disclosure. As shown in FIG. 6, the method includes:

operation 601: information on key points in a target human body in an image frame is processed, to calculate key-point features of the target human body, the key-point features including a position of predetermined key point and an angle of a predetermined joint in the target human body; and operation 602: an action of the target human body is recognized according to the key-point features, and a first recognition result is outputted.

In at least one embodiment, operation 601 may be carried out, for example, according to options 401 and 402 in FIG. 4.

As shown in FIG. 6, the method further includes: operation 603: according to parameters of motion of the predetermined key points in the target human body, and/or an outputted second recognition result for an action of the target human body in a historical image frame preceding the image frame, the first recognition result is corrected, and a second recognition result for the action of the target human body in the image frame is outputted.

As shown in FIG. 6, the method further includes:

operation 604: motion vectors between each predetermined key point in the target human body in the image frame and a corresponding predetermined key point in the target human body in the historical image frame are calculated, and the parameters of motion are calculated according to the motion vectors of the predetermined key points.

In operation 604, the parameters of motion include: a mean value of the motion vectors of the predetermined key points, and/or a standard variance between the motion vectors of the predetermined key points, and/or moving directions of the predetermined key points, and/or the number of the predetermined key points moving in a predetermined direction.

As shown in FIG. 6, the method further includes:

operation 605: an amount of image frames spacing the historical frame and the image frame apart is determined according to an acquisition rate of the image frame.

According to the second aspect of the embodiments of this disclosure, the action recognition method recognizes the action of the human body based on the positions of the key points and the angles of joints in the human body in the image frame. As the positions of the key points and the angles of the joints are a part of the information in the image frame, accurate classification may be performed with a relatively small amount of calculation without needing to use a deep learning network; and in comparison with a scheme of performing action recognition based only on the positions of key points, the action recognition method of this disclosure may further perform action recognition based the angles of the joints in the human body, hence, an accuracy of recognition will be higher. And furthermore, if an action needing to be recognized needs to be added or changed, it may be realized by adjusting the predetermined key point and/or the predetermined joint, without needing a large amount of training. Hence, the action recognition method of this disclosure is relatively good in scalability and relatively high in flexibility. And furthermore, as the action recognition method of this disclosure is able to adjust the action recognition results based on the relationship between actions of the human body and time, the action of the human body may be recognized more accurately.

Third Aspect of the Embodiments

The third aspect of the embodiments of this disclosure provides an electronic equipment, including the action recognition apparatus described in the first aspect of the embodiments of this disclosure.

Figure 7:
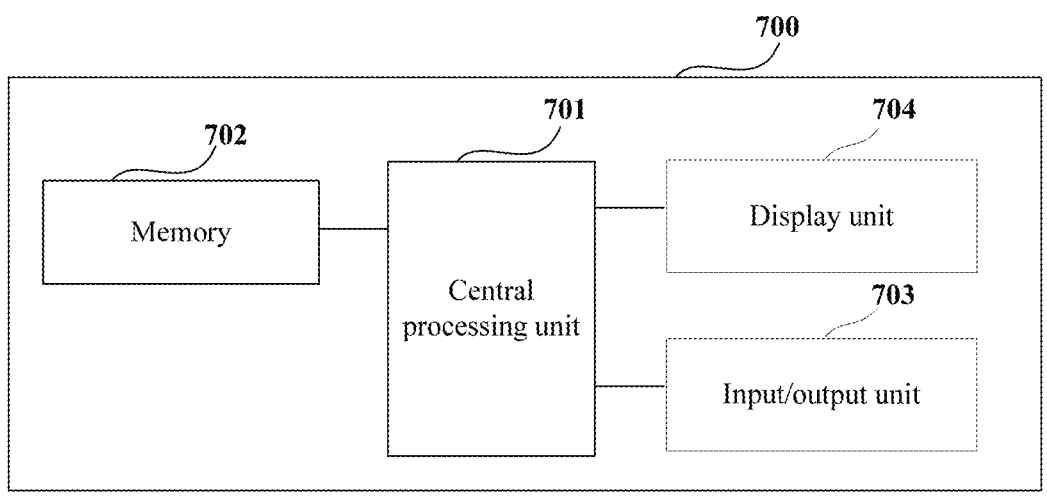
FIG. 7 is a schematic diagram of a structure of the electronic equipment of the third aspect of the embodiments.

FIG. 7 is a schematic diagram of a structure of the electronic equipment of the third aspect of the embodiments. As shown in FIG. 7, an electronic equipment 700 may include a central processing unit (CPU) 701 and a memory 702, the memory 702 being coupled to the central processing unit 701. The memory 702 may store various data, and furthermore, it may store a program for control, and execute the program under control of the central processing unit 701.

In one implementation, the functions of the action recognition apparatus 1 may be integrated into the central processing unit 701.

The central processing unit 701 may be configured to carry out the action recognition method described in the second aspect of the embodiments.

Furthermore, as shown in FIG. 7, the electronic equipment 700 may include an input unit 703, and a display unit 704, etc.; wherein, functions of the above components are similar to those in the related art, and shall not be described herein any further. It should be noted that the electronic equipment 700 does not necessarily include all the parts shown in FIG. 7. Furthermore, the electronic equipment 700 may include parts not shown in FIG. 7, and the related art may be referred to.

An embodiment of the present disclosure provides a computer readable program code, which, when executed in an action recognition apparatus or an electronic equipment, will cause the action recognition apparatus or the electronic equipment to carry out the action recognition method as described in the second aspect of the embodiments.

An embodiment of the present disclosure provides a computer storage medium, including a computer readable program code, which will cause an action recognition apparatus or an electronic equipment to carry out the action recognition method as described in the second aspect of the embodiments.

The action recognition apparatus described with reference to the embodiments of this disclosure may be directly embodied as hardware, software modules executed by a processor, or a combination thereof. For example, one or more functional block diagrams and/or one or more combinations of the functional block diagrams shown in the drawing may either correspond to software modules of procedures of a computer program, or correspond to hardware modules. Such software modules may respectively correspond to the steps shown in the first aspect of the embodiments. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawing may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawing may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

1. An action recognition apparatus, including:
a key-point feature extracting unit configured to process information on key points in a target human body in an image frame, to calculate key-point features of the target human body, the key-point features including a position of a predetermined key point and an angle of a predetermined joint in the target human body; and
a first recognizing unit configured to recognize an action of the target human body according to the key-point features, and output a first recognition result.

2. The action recognition apparatus according to supplement 1, wherein the processing information on key points in a target human body in an image frame by the key-point feature extracting unit includes:
adjusting coordinate values of the predetermined key point in the target human body in the image frame according to a height of the target human body in the image frame; and
calculating the angle of the predetermined joint according to the adjusted coordinate values of the predetermined key point in the target human body in the image frame.

3. The action recognition apparatus according to supplement 2, wherein,
the height of the target human body in the image frame is a difference between a coordinate value in a height direction of a key point where an eye of the target human body in the image frame is located and a coordinate value in a height direction of a key point where an ankle of the target human body in the image frame is located.

4. The action recognition apparatus according to supplement 1, wherein the action recognition apparatus further includes:
a second recognizing unit configured to, according to a parameter of motion of the predetermined key point in the target human body, and/or a second recognition result outputted by the second recognizing unit for an action of the target human body in a historical image frame preceding the image frame, correct the first recognition result, and output a second recognition result for the action of the target human body in the image frame.

5. The action recognition apparatus according to supplement 4, wherein the action recognition apparatus further includes:
a key-point motion parameter calculating unit configured to calculate motion vectors between each predetermined key point in the target human body in the image frame and a corresponding predetermined key point in the target human body in the historical image frame, and calculate the parameters of motion according to the motion vectors of the predetermined key points.

6. The action recognition apparatus according to supplement 5, wherein,
the parameters of motion include: a mean value of the motion vectors of the predetermined key points, and/or a standard variance between the motion vectors of the predetermined key points, and/or moving directions of the predetermined key points, and/or the number of the predetermined key points moving in a predetermined direction.

7. The action recognition apparatus according to supplement 4, wherein the action recognition apparatus further includes:
an image frame interval determining unit configured to determine an amount of image frames spacing the historical frame and the image frame apart according to an acquisition rate of the image frame.

8. An electronic equipment, including the action recognition apparatus as described in any one of supplements 1-7.

9. An action recognition method, including:
processing information on key points in a target human body in an image frame, to calculate key-point features of the target human body, the key-point features including a position of predetermined key point and an angle of a predetermined joint in the target human body; and
recognizing an action of the target human body according to the key-point features, and outputting a first recognition result.

10. The action recognition method according to supplement 9, wherein the processing information on key points in a target human body in an image frame includes:
adjusting coordinate values of the predetermined key point in the target human body in the image frame according to a height of the target human body in the image frame; and
calculating the angle of the predetermined joint according to the adjusted coordinate values of the predetermined key point in the target human body in the image frame.

11. The action recognition method according to supplement 10, wherein,
the height of the target human body in the image frame is a difference between a coordinate value in a height direction of a key point where an eye of the target human body in the image frame is located and a coordinate value in a height direction of a key point where an ankle of the target human body in the image frame is located.

12. The action recognition method according to supplement 9, wherein the action recognition method further includes:

according to parameters of motion of the predetermined key points in the target human body, and/or an outputted second recognition result for an action of the target human body in a historical image frame preceding the image frame, correcting the first recognition result, and outputting a second recognition result for the action of the target human body in the image frame.

13. The action recognition method according to supplement 12, wherein the action recognition method further includes:

calculating motion vectors between each predetermined key point in the target human body in the image frame and a corresponding predetermined key point in the target human body in the historical image frame, and calculating the parameters of motion according to the motion vectors of the predetermined key points.

14. The action recognition method according to supplement 13, wherein, the parameters of motion include: a mean value of the motion vectors of the predetermined key points, and/or a standard variance between the motion vectors of the predetermined key points, and/or moving directions of the predetermined key points, and/or the number of the predetermined key points moving in a predetermined direction.

15. The action recognition method according to supplement 12, wherein the action recognition method further includes:

determining an amount of image frames spacing the historical frame and the image frame apart according to an acquisition rate of the image frame.

The invention claimed is:

1. An action recognition apparatus, characterized in that the action recognition apparatus comprises:
   a memory to store a plurality of instructions; and
   a processor coupled to the memory and configured to:
   process information on key points in a target human body in an image frame, to calculate key-point features of the target human body, the key-point features comprising a position of a predetermined key point and an angle of a predetermined joint in the target human body; and
   recognize an action of the target human body according to the key-point features, and output a first recognition result,
   wherein the processing information on key points in a target human body in an image frame comprises:
   adjusting coordinate values of the predetermined key point in the target human body in the image frame according to a height of the target human body in the image frame; and
   calculating the angle of the predetermined joint according to adjusted coordinate values of the predetermined key point in the target human body in the image frame, wherein
   the height of the target human body in the image frame is a difference between a coordinate value in a height direction of a key point where an eye of the target human body in the image frame is located and a coordinate value in a height direction of a key point where an ankle of the target human body in the image frame is located.

2. The action recognition apparatus according to claim 1, wherein the processor is further configured to:
   according to a parameter of motion of the predetermined key point in the target human body, and/or a second recognition result for an action of the target human body in a historical image frame preceding the image frame, correct the first recognition result, and output a second recognition result for the action of the target human body in the image frame.

3. The action recognition apparatus according to claim 2, wherein the processor is further configured to:
   calculate motion vectors between each predetermined key point in the target human body in the image frame and a corresponding predetermined key point in the target human body in the historical image frame, and calculate the parameters of motion according to the motion vectors of the predetermined key points.

4. The action recognition apparatus according to claim 3, wherein,
   the parameters of motion comprise: a mean value of the motion vectors of the predetermined key points, and/or a standard variance between the motion vectors of the predetermined key points, and/or moving directions of the predetermined key points, and/or t number of the predetermined key points moving in a predetermined direction.

5. The action recognition apparatus according to claim 2, wherein the processor is further configured to:
   determine an amount of image frames spacing the historical frame and the image frame apart.

6. An electronic equipment, comprising the action recognition apparatus as claimed in claim 1.

7. An action recognition method, characterized in that the action recognition method comprises:
   processing information on key points in a target human body in an image frame, to calculate key-point features of the target human body, the key-point features comprising a position of predetermined key point and an angle of a predetermined joint in the target human body; and
   recognizing an action of the target human body according to the key-point features, and outputting a first recognition result,
   wherein the processing information on key points in a target human body in an image frame comprises:
   adjusting coordinate values of the predetermined key point in the target human body in the image frame according to a height of the target human body in the image frame; and
   calculating the angle of the predetermined joint according to adjusted coordinate values of the predetermined key point in the target human body in the image frame, wherein
   the height of the target human body in the image frame is a difference between a coordinate value in a height direction of a key point where an eye of the target human body in, the image frame is located and a coordinate value in a height direction of a key point where an ankle of the target human body in the image frame is located.

8. The action recognition method according to claim 7, wherein the action recognition method further comprises:
   according to parameters of motion of the predetermined key points in the target human body, and/or an outputted second recognition result for an action of the target human body in a historical image frame preceding the image frame, correcting the first recognition result, and outputting a second recognition result for the action of the target human body in the image frame.

* * * * *